US012803999B2

(12) United States Patent
Gharakheili et al.

(10) Patent No.: US 12,803,999 B2
(45) Date of Patent: Nov. 17, 2026

(54) COMBINING DEVICE BEHAVIORAL MODELS AND BUILDING SCHEMA FOR CYBER-SECURITY OF LARGE-SCALE IOT INFRASTRUCTURE

(71) Applicant: NEWSOUTH INNOVATIONS PTY LIMITED, Sydney (AU)

(72) Inventors: Hassan Habibi Gharakheili, Sydney (AU); Mohammed Ayyoob Ahamed Hamza, Sydney (AU); Vijay Sivaraman, Sydney (AU)

(73) Assignee: NEWSOUTH INNOVATIONS PTY LIMITED, Sydney (AU)

( * ) Notice: Subject to any disclaimer, the term of this patent is extended or adjusted under 35 U.S.C. 154(b) by 89 days.

(21) Appl. No.: 18/687,630

(22) PCT Filed: Aug. 30, 2022

(86) PCT No.: PCT/IB2022/058136
§ 371 (c)(1),
(2) Date: Feb. 28, 2024

(87) PCT Pub. No.: WO2023/031804
PCT Pub. Date: Mar. 9, 2023

(65) Prior Publication Data
US 2024/0380768 A1 Nov. 14, 2024

Related U.S. Application Data

(60) Provisional application No. 63/238,755, filed on Aug. 30, 2021.

(51) Int. Cl.
*H04L 9/40* (2022.01)
*G16Y 30/10* (2020.01)

(52) U.S. Cl.
CPC .......... *H04L 63/1425* (2013.01); *H04L 63/20* (2013.01); *G16Y 30/10* (2020.01)

(58) Field of Classification Search
CPC ............. H04L 63/0254; H04L 63/0263; H04L 63/1425; H04L 63/20; G16Y 30/10;
(Continued)

(56) References Cited

U.S. PATENT DOCUMENTS 11,611,532 B1 * 3/2023 Haefner .................. H04L 63/10
12,470,573 B1 * 11/2025 Scriber ............... H04L 63/1425
(Continued)

FOREIGN PATENT DOCUMENTS

WO 2020118375 A1 6/2020
WO 2020118376 A1 6/2020
WO 2020118377 A1 6/2020

OTHER PUBLICATIONS

Balaji et al., Brick: Towards a Unified Metadata Schema For Buildings., Nov. 16, 2016. https://research.IBM.com/publications/brick-towards-a-unified-metadata-schema-for-buildings (Year: 2016).*
(Continued)

*Primary Examiner* — Kostas J Katsikis
(74) *Attorney, Agent, or Firm* — Myers Bigel, P.A.

(57) ABSTRACT

Embodiments of the present disclosure may include a method for enforcing network flow rules of a heterogeneous network of devices including receiving a description of a physical environment. Embodiments may also include receiving a device behavior profile of a plurality of network
(Continued)

devices. Embodiments may also include receiving at least one network configuration input. Embodiments may also include translating the received description of the physical environment, the received device behavior profile, and the at least one network configuration input into a formal model. Embodiments may also include determining network flow rules based at least in part on the formal model. Embodiments may also include enforcing the network flow rules. In some embodiments, the network flow rules enhance the security of a heterogeneous network of devices.

19 Claims, 14 Drawing Sheets

(58) Field of Classification Search
CPC ........ G16Y 20/10; G16Y 20/20; G16Y 20/30; G16Y 20/40; G16Y 40/10; G16Y 40/20; G16Y 40/30; G16Y 40/35
See application file for complete search history.

(56) References Cited

U.S. PATENT DOCUMENTS

| | | | | |
|---|---|---|---|---|
| 2016/0352836 | A1 | 12/2016 | Kamalakantha et al. | |
| 2018/0332053 | A1 | 11/2018 | Weis et al. | |
| 2019/0260794 | A1 | 8/2019 | Woodford et al. | |
| 2020/0137119 | A1 | 4/2020 | Jin et al. | |
| 2022/0086064 | A1* | 3/2022 | Sivaraman | H04L 47/2483 |
| 2022/0086070 | A1* | 3/2022 | Sivaraman | H04L 47/2483 |

OTHER PUBLICATIONS

Qazi et al., SIMPLE-fying Middlebox Policy Enforcement Using SDN., 2013. https://minlanyu.seas.harvard.edu/writeup/sigcomm13.pdf (Year: 2013).*

"International Search Report and Written Opinion of the International Searching Authority", Dec 20, 2022, 8 pp.

Balaji, Bharathan , et al., "Brick: Metadata schema for portable smart building applications", Applied Energy, vol. 226, Sep. 15, 2018, pp. 1273-1292.

Loi, Franco , et al., "Systematically Evaluating Security and Privacy for Consumer IoT Devices", IoTS&P '17: Proceedings of the 2017 Workshop on Internet of Things Security and Privacy,, Nov. 2017, 6 pp.

Sivaraman, Vijay , et al., "Network-Level Security and Privacy Control for Smart-Home IoT Devices", 2015 IEEE 11th International Conference on Wireless and Mobile Computing, Networking and Communications (WiMob), Abu Dhabi, UAE, Oct. 19, 2015, 5 pp.

Sivaraman, Vijay , et al., "Smart IoT Devices in the Home", IEEE Technology and Society Magazine, vol. 37, No. 2, Jun. 2018, pp. 71-79.

Tschofenig, H. , et al., "TLS/DTLS 1.3 Profiles for the Internet of Things", draft-ietf-uta-tls 13-iot-profile-08, Standards Track, RFC 2925, Oct. 22, 2023, 22 pp.

Yu, Tianlong , et al., "Handling a trillion (unfixable) flaws on a billion devices: rethinking network security for the Internet-of-Things", Proc. ACM HotNets, Philadelphia, PA, USA, Nov. 16, 2015, 7 pp.

* cited by examiner

COMBINING DEVICE BEHAVIORAL MODELS AND BUILDING SCHEMA FOR CYBER-SECURITY OF LARGE-SCALE IOT INFRASTRUCTURE

CROSS-REFERENCE TO RELATED APPLICATIONS

This application is a 35 U.S.C. § 371 national stage application of PCT Application No. PCT/IB2022/058136, filed on Aug. 30, 2022, which claims priority to U.S. Provisional Patent Application No. 63/238,755, filed Aug. 30, 2021, titled "COMBINING DEVICE BEHAVIORAL MODELS AND BUILDING SCHEMA FOR CYBER-SECURITY OF LARGE-SCALE IOT INFRASTRUCTURE," both of which are hereby incorporated by reference in their entireties.

TECHNICAL FIELD

Embodiments of the present disclosure relate to network security, and more particularly, to using data models in network cybersecurity.

BACKGROUND

Today, Internet of Things (IoT) connected building systems with several heterogeneous devices are exposed to cyberattacks. A large IoT infrastructure for smart buildings may consist of many subsystems such as Heating, ventilation, and air conditioning (HVAC), lighting, access controllers, occupancy sensors, or physical security systems. These subsystems are often managed by a variety of stakeholders from network architect, network engineers, facility management engineers, and cybersecurity analysts to device manufactures, system integrators, and building managers throughout the life-cycle of a smart building. These stakeholders produce different data schema to maintain information about the physical location, network configuration, or security policies of IoT devices.

The lack of a common data model is a major challenge in limiting the interoperability and holistic analysis of heterogeneous IoT systems. This has led to many cyber-attacks—for example, the Shodan search engine [18] has listed publicly exposed building management systems, allowing attackers to penetrate those networks. Current methods for evaluating the security posture of such environments are at best ad-hoc, and enforcement and monitoring of appropriate access control from outside and within the organization are lacking. However, securing large IoT systems demands a formal model that enables, at design stage, an evaluation of the attack surface exposed by the smart environment, including assessments of firmware updates, breached elements, and organization policy changes on overall security. Also, the model needs to be enforced at run-time, including monitoring the communication flows to detect anomalous patterns indicative of volumetric attacks.

Operators of modern buildings and infrastructure are increasingly adopting a range of IoT devices to better manage utilization of physical spaces, improve the safety of occupants, save energy, and reduce maintenance costs. From a traditionally static and proprietary environment of standalone systems, smart buildings are moving towards a dynamic environment driven by connected systems and standard protocols. In these systems, automatic decisions are often made by IoT controllers based on data collected from many devices such as security cameras, smart-lights, smokealarms, or occupancy sensors sourced from a diversity of vendors. Integrating cloud-based servers with many different types of devices, each with their own security flaws (e.g., weak/no encryption, open ports, default username/passwords) exponentially increases the potential attack surfaces on smart environments.

Though research papers like F. Loi, A. Sivanathan, H. Habibi Gharakheili, A. Radford, and V. Sivaraman, "Systematically Evaluating Security and Privacy for Consumer IoT Devices," in Proc. ACM IoT S&P, Dallas, Texas, USA, November 2017 and V. Sivaraman, H. Habibi Gharakheili, C. Fernandes, N. Clark, and T. Karliychuk, "Smart IoT Devices in the Home: Security and Privacy Implications," IEEE Technology and Society Magazine, vol. 37, no. 2, pp. 71-79, June 2018, the contents of each are incorporated in their entirety by reference, have identified myriad security flaws in IoT devices, few have suggested solutions beyond the patching of these flaws by the respective manufacturers. These techniques are doomed to failure given the large number of vendors and their limited motivation to support a device beyond its sale. A promising direction is to monitor and lockdown the network activity of IoT devices to detect and block misbehavior, such as those described and incorporated in their entirety by reference in T. Yu, V. Sekar, S. Seshan, Y. Agarwal, and C. Xu, "Handling a Trillion (Unfixable) Flaws on a Billion Devices: Rethinking Network Security for the Internet-of-Things," in Proc. ACM HotNets, Philadelphia, PA, USA, November 2015 and V. Sivaraman, H. Habibi Gharakheili, A. Vishwanath, R. Boreli, and O. Mehani, "Network-level security and privacy control for smart-home iot devices," in Proc IEEE WiMob, Abu Dhabi, UAE, October 2015, giving the network operator a second line of defense against compromised or misbehaving devices without relying solely on appropriate security protections by the IoT supplier. The success of this approach, however, relies on knowing the expected network behavior of each IoT device, and the interactions of these devices in a specific deployment environment such as a building or an enterprise.

Today, a large-scale digital infrastructure is typically managed by two entities Estate Management (assets) and IT department (network). Such disjoint management of information makes it challenging to verify the operation of the entire system (building, campus) and secure it against cyber threats.

BRIEF SUMMARY

Embodiments of the present disclosure may include a method for enforcing network flow rules of a heterogeneous network of devices including receiving a description of a physical environment. Embodiments may also include receiving a device behavior profile of a plurality of network devices. Embodiments may also include receiving at least one network configuration input. Embodiments may also include translating the received description of the physical environment, the received device behavior profile, and the at least one network configuration input into a formal model. Embodiments may also include determining network flow rules based at least in part on the formal model. Embodiments may also include enforcing the network flow rules. In some embodiments, the network flow rules enhance the security of a heterogeneous network of devices. In some embodiments, a description of a physical environment may include a combination of at least one of a room name, a sensor, a utility, a building material, a building floor, a building performance, an asset list, a stairwell, an elevator, a structural element, a fire escape, a furniture piece, an available resource, a time restricted use, a temperature setting, a humidity setting, an air quality parameter, an area occupancy, an area dimension, an area usage restriction, a maintenance status, a password, a username, an area access restriction, a status, an occupancy restriction, a door, a window, an architectural floor plan, or an area intended use.

In some embodiments, the physical environment is at least one of a building, a campus, a maritime craft, a rail-based transportation system, an oil refinery, a mining operation, a chemical plant, a nuclear plant, an alternative energy plant, a nursery, an agricultural field, a municipality, a semiconductor foundry, a port, a warehouse, a stadium, or a university campus. In some embodiments, a description of a physical environment may also include a class and a tag.

In some embodiments, the class and the tag are used to describe a relationship amongst two or more network devices amongst the plurality of network devices. In some embodiments, a description of a physical environment is a hierarchical construct of a relationship of at least two network devices based at least in part on a class of each of the two network devices and one or more tags. In some embodiments, a description of a physical environment may include a Resource Description Framework (RDF) syntax to maintain a system ontology.

Embodiments may also include an interaction with the system ontology using a query-based language. In some embodiments, a query-based language is SPARQL Protocol and RDF Query Language (SPARQL). In some embodiments, a description of a physical environment may include a Brick model. In some embodiments, a description of a physical environment may include metadata. In some embodiments, a device behavior profile may include a pattern of device communications.

In some embodiments, a pattern of device communications may include a set of machine-readable constructs describing a network flow of the network device. In some embodiments, a device behavior profile is based at least in part on an Internet Engineering Task Force IETF Manufacturer Usage Description (MUD) Standard. In some embodiments, a device behavior profile may include access control entries (ACE) of the network device. In some embodiments, the access control entries (ACE) of the network device are serialized in a JavaScript Object Notation (JSON) format.

In some embodiments, the access control entries (ACE) describe a direction of communication of the network device. In some embodiments, a direction of communication of the network device may include an at least from device and an at least one to-device direction. Embodiments may also include access control entries (ACE) of the network device match based at least in part on one of a source port number or a destination port number for Transmission Control Protocol (TCP) or User Datagram Protocol (UDP), and a type and code for Internet Control Message Protocol (ICMP).

In some embodiments, a pattern of device communications distinguishes local network traffic from Internet communications. In some embodiments, a pattern of device communications provides a support of ambiguities through a controller tag. In some embodiments, the receiving a device behavior profile of a plurality of network devices may also include discovering at least one network devices. In some embodiments, a network device is one of a security camera, a thermostat, an occupancy sensor, an HVAC system, a lighting system, an access controller, a fire alarm, a physical security system, a camera, a networked appliance, an industrial device, or a robotic device.

In some embodiments, a device behavior profile may include a semantic, the semantic may include at least one class and at least one property. In some embodiments, an at least one network configuration input is a network address, a port, or a Virtual Local Area Network (VLAN). In some embodiments, receiving at least one network configuration input may include running an IP address retrieval query. In some embodiments, running an IP address retrieval query may include running a SPARQL query.

In some embodiments, receiving at least one network configuration input may include receiving a network configuration file of the plurality of network devices. In some embodiments, receiving at least one network configuration input may include receiving at least one file such as a spreadsheet or a text file. In some embodiments, the spreadsheet or the text file of network configurations of the plurality of network devices.

In some embodiments, receiving at least one network configuration input may include receiving a semantic schema. In some embodiments, the semantic schema may include at least one class and at least one property. In some embodiments, the translating a formal model is translated via a modelling tool. In some embodiments, the modelling tool is a MudBrick tool. In some embodiments, the MudBrick tool may also include a linker module. In some embodiments, the linker module translates the received description of the physical environment, the received device behavior profile, and the at least one network configuration input into the formal model.

In some embodiments, the linker module is extensible accepting various formats of an organizational network device configuration. In some embodiments, the formal model may include a knowledge representation of a network ontology. In some embodiments, the translating a formal model is translated via a linker module. In some embodiments, the linker module builds a machine-readable knowledge representation of the formal model.

In some embodiments, translating the received description of the physical environment, the received device behavior profile, and the at least one network configuration input into a formal model may include, combining a semantic of the received description of the physical environment, and a semantic of the received device behavior profile into a machine-readable knowledge representation of the heterogeneous network of devices.

In some embodiments, translating the received description of the physical environment, the received device behavior profile, and the at least one network configuration input into a formal model may include, combining at least one class and at least one property of the received description of the physical environment with at least one class and at least one property of the received device behavior profile into a machine-readable knowledge representation of the heterogeneous network of devices.

In some embodiments, combining at least one class and at least one property of the received description of the physical environment with at least one class and at least one property of the received device behavior profile into a machine-readable knowledge representation of the heterogeneous network of devices may also include receiving a unique identifier for each of the description of the physical environment, the device behavior profile of each of the plurality of network devices, and the at least one network configuration input. Embodiments may also include correlating unique identifiers for each of the description of the physical environment, the device behavior profile of each of the plurality of network devices, and the at least one network configuration input to create a combined MUD Brick profile.

In some embodiments, the unique identifier for each of the description of the physical environment and the at least one network configuration input is at least one of a Media Access Control (MAC) address or an IP address and the unique identifier for each of the device behavior profile of each of the plurality of network devices and the description of the physical environment is a class. In some embodiments, the determining network flow rules is based at least in part on the formal model. In some embodiments, a plurality of access control entries (ACE) of the formal model are translated to network flow rules.

In some embodiments, the network flow rules may include rules priority to govern network activity of the plurality of network devices. In some embodiments, the determining network flow rules may include an access control list (ACL). In some embodiments, the network flow rules may include a deterministic routing policy based at least in part on the description of a physical environment for each network device of the plurality of network devices.

In some embodiments, the description of a physical environment for each network device is a physical location of the network device. In some embodiments, determining network flow rules based at least in part on the formal model may include verifying the formal model is compliant with an organizational policy. In some embodiments, the verifying the formal model is compliant with an organizational policy may also include identifying a network traffic flow that violates the organizational policy.

In some embodiments, the network traffic flow that violates the organizational policy is removed from the network flow rules. In some embodiments, the network traffic flow that violates the organizational policy is modified to comply with the organizational policy. Embodiments may also include the determining network flow rules is based at least in part on by applying a plurality of network policies to the formal model.

In some embodiments, enforcing the network flow rules may include using a programmable networking technique. In some embodiments, the programmable networking technique is implemented using a programmable switch. In some embodiments, the programmable networking technique is implemented using a Software Defined Network switch. In some embodiments, the network flow rules may include at least one location-defined network policy.

In some embodiments, the at least one location-defined network policy is a deployment policy, an administrative policy, and an organizational policy. In some embodiments, the at least one location-defined network policy restricts access of a resource to at least one operational zone. Embodiments may also include verifying an intended system behavior of the network device. Embodiments may also include periodically collecting network run-time activity from a network switch.

In some embodiments, the periodically collecting network run-time activity from a network switch is performed by a dynamic verification application. In some embodiments, the run-time activity is analyzed by a set of pre-trained anomaly detection models. In some embodiments, the set of pre-trained anomaly detection models is trained to a particular network device and the description of the physical environment.

Embodiments may also include determining anomalous behavior of at least one network device based on the network flow rules. In some embodiments, the determining anomalous behavior may include employing at least one data-driven model based at least in part on at least one device behavior profile of a plurality of network devices. In some embodiments, the determining anomalous behavior may include applying a machine learning technique to distinguish a normal device network behavior from an anomalous device network behavior.

In some embodiments, the applying a machine learning technique to distinguish a normal device network behavior from an anomalous device network behavior may include training a machine learning technique with a benign network traffic profile of an IoT controller. In some embodiments, the machine learning technique creates at least one boundary of acceptable network traffic behavior. Embodiments may also include detecting anomalous behavior by determining a run-time network traffic flow deviates from the at least one boundary of acceptable network traffic behavior.

Embodiments may also include an anomaly detection engine, the anomaly detection engine including a building anomaly worker model. In some embodiments, the building model anomaly worker monitors network traffic flows between the plurality of network devices and a controller. Embodiments may also include a device anomaly worker model. In some embodiments, the device anomaly worker model monitors network traffic flows between a network device from the plurality of network devices and the controller. Embodiments may also include detecting an anomalous behavior based at least in part on an anomalous behavior alert from each of the building model and the device model.

Embodiments of the present disclosure may also include a system for anomalous behavior detection, the system including a first network device d1. In some embodiments, the first network device is positioned in a first building B1. Embodiments may also include a second network device d3. In some embodiments, the second network device is positioned in a second building B2. Embodiments may also include an IoT controller. In some embodiments, the IoT controller is operable to receive each of a first network flow f1d1 from the first network device and a first network flow f1d3 from the second network device.

Embodiments may also include a transmit each of a network flow f2d1 to the first network device and a network flow f2d3 from the second network device. Embodiments may also include a dispatcher operable to receive flow telemetry and a formal model, the dispatcher featuring at least a building model anomaly worker model MB1. In some embodiments, the building model anomaly worker MB1 monitors at least MB1 network traffic flows f1d1 and the network flow f2d1 for anomalous behavior.

Embodiments may also include a building model anomaly worker model MB2. In some embodiments, the building model anomaly worker MB2 monitors at least network traffic flows f1d3 and f2d3 for anomalous behavior. Embodiments may also include a first device anomaly worker model Md1. In some embodiments, the first device anomaly worker model Md1 monitors network traffic flows between the first network device d1 and the IoT controller for anomalous behavior. Embodiments may also include a second device anomaly worker model Md3. In some embodiments, the first device anomaly worker model Md3 monitors network traffic flows between the second network device d3 and the IoT controller for anomalous behavior.

DETAILED DESCRIPTION

Figure 1:
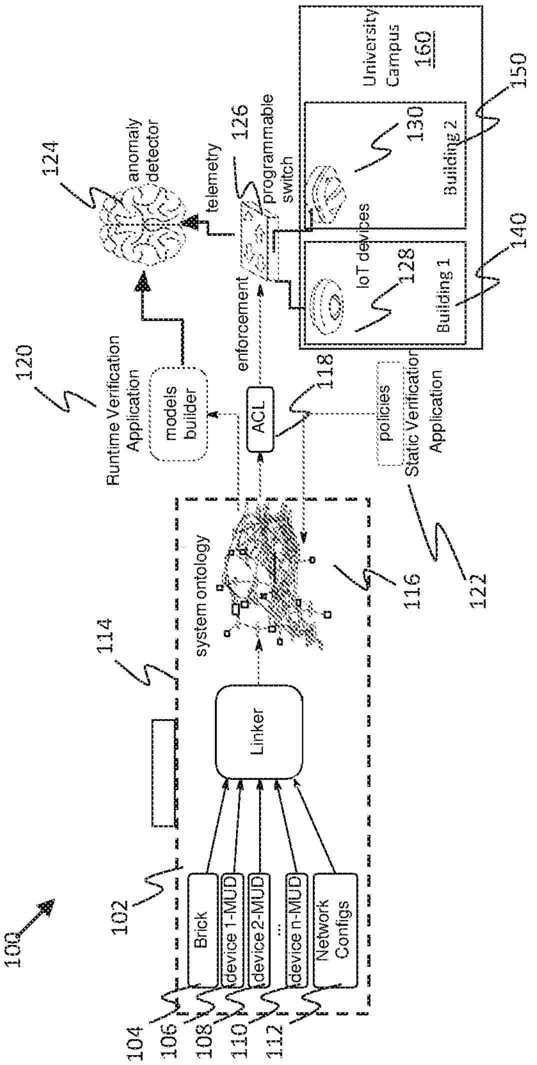
FIG. 1 depicts an exemplary embodiment of the system architecture of the present invention with formal model generation, policy verification, and rules enforcement and monitoring features.

Modern buildings are increasingly getting connected by adopting a range of IoT devices and applications from video surveillance and lighting to people counting and access control. It has been shown that rich connectivity can make building networks more exposed to cyber-attacks, and hence difficult to manage. Currently, there is no systematic approach for evaluating or enforcing cyber-security of building systems with many heterogeneous IoT devices. According to some embodiments of the present disclosure, cyber-security of large-scale IoT infrastructure may be enhanced by formally capturing the expected behavior of the system using: a static profile of a device's intended usage, buildings information, and network configurations (pre-deployment) along with continuous and dynamic diagnosis of device's network activity using machine learning models (post-deployment).

Embodiments of the present disclosure addresses critical areas of cyber-security for large-scale IoT infrastructure. In some embodiments, the first critical area that may be addressed is to provide a system and method that automatically generates a formal ontology or formal model of network communications for a connected infrastructure. In some embodiments, the formal model is made by receiving a description of a physical environment, a device behavior profile of a plurality of network devices, and at least one network configuration input. In some embodiments, inputs related to a description of a physical environment like a "Brick schema," such as described by B. Balaji, A. Bhattacharya, G. Fierro, J. Gao, J. Gluck, D. Hong, A. Johansen, J. Koh, J. Ploennigs, Y. Agarwal et al., "Brick: Metadata schema for portable smart building applications," Applied energy, vol. 226, pp. 1273-1292, 2018, (D)TLS Profiles for IoT Devices. (n.d.). Datatracker.ietf.org. Retrieved Aug. 2, 2021, from https://datatracker.ietf.org/doc/draft-ietf-opsawg-mud-tls/ which is incorporated in its entirety by reference. The received device behavior profiles of network devices may include a Manufacturer Usage Description or MUD profile. While MUD profiles may be provided by the device manufacturer, they may also be generated by employing the techniques described in A Network Device Classification Apparatus and Process (WO2020118376A1) incorporated in its entirety by reference. The received network configurations may include, for example, an IP address, port, virtual local area network (VLAN), and/or media access control (MAC) address, among other things. Once the description of the physical environment, the device behavior profile, and at least one network configuration input have been received, they can be translated into a formal model. In some embodiments, the formal model may be translated into network flow rules which can then be used to enforce network traffic. The present invention provides the first systematic effort to both model (statically) and enforce (dynamically) cyber security for large-scale IoT systems.

The second critical area that may be addressed includes the measurement of network activity of device-specific flow rules. Measurements may be used to diagnose the health of network devices using a set of trained anomaly detection models, such as one-class classifiers, each corresponding to a particular type of device and specific building location. In various embodiments, techniques may be employed that can detect attacks with reasonable accuracy of 92.5%. Finally, three types of location-defined network policies (deployment, administrative, and organizational) may be verified using techniques of the present disclosure.

Embodiments of the present disclosure may combine information from three sources, namely, intended behavior of individual IoT devices, physical assets and building data, and network configurations. In some embodiments, the embodiments of the present disclosure may draw upon emerging frameworks such as the IETF MUD (Internet Engineering Task Force Manufacturer Usage Description) standard that provides an ACL (Access Control List) like language for describing the expected network communications of an IoT device (e.g., controllers with which they talk), and Brick, such as described and incorporated in its entirety by reference B. Balaji, A. Bhattacharya, G. Fierro, J. Gao, J. Gluck, D. Hong, A. Johansen, J. Koh, J. Ploennigs, Y. Agarwal et al., "Brick: Metadata schema for portable smart building applications," Applied energy, vol. 226, pp. 1273-1292, 2018 that provides a metadata schema for the deployment environment (such as a building) including locations of sensors and their sub-system relationships.

Many techniques may be used to describe a physical environment. For example, Building Data, such as Haystack, Brick, and Industry Foundation Classes (IFC), provide constructs to formally define a metadata model to specify sensors, controllers, their location in buildings, and their inter-relationships. In some embodiments, Brick is advantageous as: (a) it describes building entities (sensors, equipment, room, floor and many more) and their relationships by abstracting classes and tags; (b) its hierarchical constructs allows to extend the Brick model to express new entities (e.g., Camera can be derived from Sensor); (c) its expressiveness and ease of adaption allow us to build a better query processor; and (d) it uses the Resource Description Framework (RDF) syntax to maintain the system ontology, this enables application developers to interact with the ontology using query-based language (e.g., SPARQL).

Brick schema discusses various applications that can benefit from building data such as energy optimization, fault detection, and risk analysis. In general, the physical description may include a name for an element within a physical environment, such as a building, a transportation vehicle, infrastructure, or an ecosystem comprising sensors within different physical environments. An example of heterogeneous physical environment may be a collection of automobiles, parking structures, recreational areas, restaurants, commercial dwelling units within a downtown urban environment. Alternatively, an oil rig, remote control headquarters, and the support maritime equipment and transport vehicles docked, approaching, and departing the rig are another example of an ecosystem of physical environment. It can be advantageous to provide greater clarity to features within the physical environment. For example, some rooms within a physical environment may have access restrictions or a stairwell or elevator may have special safety protocols associated with the physical environment. While the above descriptions have been provided for clarity, in describing a physical description of a physical environment, a number of descriptors can be used. For example, physical environment descriptors may include a building, a campus, a maritime craft, a rail-based transportation system, an oil refinery, a mining operation, a chemical plant, a nuclear plant, an alternative energy plant, a nursery, an agricultural field, a municipality, a semiconductor foundry, a port, a warehouse, a stadium, or a university campus.

All the above examples a representative physical environment where Industry 4.0 advances in adapting sensors to enhance operations performance have been made. As Industry 4.0 technologies continue to advance, it is understood the complexity of physical environments may increase. For example, a single description of a physical environment may be appropriate for smaller systems or when providing a zoomed in view of a much larger system. At times a homogeneous collection of descriptions of a physical environment may be appropriate, while a heterogeneous collection of description of a physical environment may also be relevant.

For each physical environment, additional details of the structure or area can be helpful for Estate Management (assets) and the IT department (network) to have greater clarity into where their respective assets are located and are behaving. To do so, a physical descriptor can be used, such as a Brick profile. Physical environment descriptors may include a room name, a sensor, a utility, a building material, a building floor, a building performance, an asset list, a stairwell, an elevator, a structural element, a fire escape, a furniture piece, an available resource, a time restricted use, a temperature setting, a humidity setting, an air quality parameter, an area occupancy, an area dimension, an area usage restriction, a maintenance status, a password, a username, an area access restriction, a status, an occupancy restriction, a door, a window, an architectural floor plan, or an area intended use of the physical environment.

Using a description of a physical environment, an HVAC sensor in a bedroom or a carbon monoxide sensor in an engine room, for example, can provide insights to a network operator into the types of alerts, system notifications, and behaviors that could be typical for the physical environment. To benefit from these insights, it is helpful to label the physical environment with a descriptor of the physical environment. Some non-limiting examples of a description of a physical environment are a room name, a sensor, a utility, a building material, a building floor, a building performance, an asset list, a stairwell, an elevator, a structural element, a fire escape, a furniture piece, an available resource, a time-restricted use, a temperature setting, a humidity setting, an air quality parameter, an area occupancy, an area dimension, an area usage restriction, a maintenance status, a password, a username, an area access restriction, a status, an occupancy restriction, a door, a window, an architectural floor plan, or an area intended use.

A variety of descriptions are helpful in determining network flow rules from the formal model. In some embodiments, the description of a physical environment may include descriptions like a class and a tag. The class and the tag may be used to describe a relationship amongst two or more network devices amongst the plurality of network devices. Network devices may be selected from the same class, while the tag associated with the class may describe a common controller connecting two network devices such as two cameras. In some embodiments a description of the physical environment is a hierarchical construct of a relationship of at least two network devices based at least in part on a class of each of the two network devices and one or more tags. One such example of a hierarchical construct may include a class such as a camera and a subclass sensor. Physical environments can be described using syntaxes, such as a Resource Description Framework (RDF) syntax to maintain a system ontology.

Descriptions of physical environments may also include interactions within the system ontology. This may be accomplished using a query-based language, such as SPARQL or using descriptions provided in metadata. In some embodiments, a device behavior profile comprises a semantic, the semantic comprises at least one class and at least one property.

As opposed to general-purpose computers, IoT devices have a limited and recognizable pattern of communications. Such a pattern of device communications may be captured as a set of machine-readable constructs describing a network flow of the network device.

This allows IoT device behavior to be captured succinctly and verified formally. IETF MUD (Manufacturer Usage Description), or simply "MUD," is a standard that provides a set of machine-readable constructs to capture the flow information of a device. MUD allows a device manufacturer to define the behavior of their device in the form of access control lists. A device behavior profile of a network device, such as a MUD may be requested, for example from a manufacturer database, a network owner, or a $3^{rd}$ party repository storing MUD compliant behavior profiles, and received once the network device has been discovered. In some embodiments, a MUD profile may be developed by recording network behavior, such as disclosed in the inventors' work in patent application publications WO2020118376A1, WO2020118377A1, and WO2020118375A1; the contents of which are incorporated in their entirety by reference. Network device MUD profiles can be developed and/or received by the cybersecurity system for a number of devices, such as those for a security camera, a thermostat, an occupancy sensor, an HVAC system, a lighting system, an access controller, a fire alarm, a physical security system, a camera, a networked appliance, an industrial device, or a robotic device.

In various embodiments, a valid MUD profile may comprise several access control entries (ACE), serialized in JSON format. Access-lists can be advantageous in that they are explicit in describing the direction of communication, i.e., from device, and to-device. Each ACE would match on source/destination port numbers for TCP/UDP, and type and code for ICMP. The MUD specifications also distinguish local network traffic from Internet communications and provide the support of ambiguities through controller tag which during the deployment system integrators can configure the server location.

Network Configuration: In various embodiments, a Software Defined Network (SDN) network controller and a network switch can be used as at least part of a network monitoring system to identify and classify network flows in real-time at scale. Other network configurations can be used to pull in network configuration inputs, such as a network address, a port or port number, or VLAN information. Network configuration inputs may be received using several techniques, such as by running an IP address retrieval query, such as a SPARQL query. Alternatively, network configuration inputs may be stored or recorded in a network configuration file that includes information for all the network attached devices. As will be appreciated, a network configuration file may take on many forms, non-limiting examples of which include a spreadsheet or a text file. In some embodiments the received network configuration input includes a semantic schema including classes and properties.

An adaptive network telemetry system using Software-Defined Networking (SDN) for an accurate attack detection consistent with the present invention is described. A network topology and traffic distribution, can be used in some embodiments to develop and implement an algorithm. Techniques may be used to discover the relevant network devices of nodes in the network topology. Techniques may also be used to determine an appropriate sampling resolution to collect network data during volumetric and distributed attacks. A programmable data-plane may be used to develop a scalable telemetry for collecting and analyzing network traffic in real-time. In the present example, programmable switches may be used to create a better defense mechanism against distributed denial-of-service (DDoS) attacks. The SDN control plane may accomplish two functions: (a) automatically inserting network rules obtained from the formal ontology, and (b) periodically collecting the activity of network rules for real-time diagnosis by trained inferencing models.

Static Security Verification: MUD profiles are used for verifying the compatibility of an IoT device, or networked device, within an organizational network policy for acceptance. Static security verification detects/resolves conflicts among trigger-and-action based policies set by network administrators in IoT environments. Trigger and-action-based policies can be used to support MUD access-control rules and building/floor constructs. In one embodiment, a combination of MUD profiles and building Brick schema may be used to verify location-defined network policies for large-scale IoT systems.

Runtime Security Verification: MUD specifications can be fed to an IDS (Intrusion Detection System) to detect runtime behaviors that do not conform to what is specified as expected or intended behavior, thereby indicating an anomaly or threat. MUD may enable enforcement of a baseline security control for IoT devices by, for example, isolating exception traffic that does not match the device intended ACEs. However, studies have shown that the attacks are still possible. Investigators have used anomaly detection techniques to secure devices by modeling the traffic characteristics of individual devices. In contrast, embodiments of the present disclosure may detect anomalies by looking at the traffic characteristics of both individual devices and a group (based on the group location) of devices in a physical environment, such as a building.

Generating a Formal Model of Communications for an IoT Infrastructure

The elements of the formal model of communications for an IoT system and how formal models are generated using the principles of the present invention are described. The present invention may allow for static or dynamic security evaluations by applying a system architecture of the present invention to a real IoT infrastructure. Embodiments of the present disclosure may automatically generate a formal model for the intended behavior of the entire IoT system by combining MUD profile of devices, Brick schema of buildings, and network configurations. Following generation of the system ontology, flow rules may be automatically generated and enforced in the network using a programmable control plane. Anomaly detection models can then be used to continuously monitor the activity of IoT traffic flows at building-level and device-level. Lastly, the compatibility of the IoT system behaviors in various embodiments can be systematically checked against, for example, three representative organizational policies, prior to deployment.

For illustrative purposes, embodiments of the present disclosure were applied to an IoT infrastructure testbed consisting of twenty (20) IoT devices/networked devices of three types (i.e., six units of a people counting camera manufactured by Steinel, twelve units of a beam counter device manufactured by EvolvePlus, two units of license plate recognition cameras manufactured by Nedap) placed across seven physical environments, e.g., buildings across a university campus. The trained models that were employed were shown to yield an acceptable system monitoring accuracy of 92.5%.

A system architecture 100, according to various embodiments of the present invention, is shown in FIG. 1. In some embodiments, a MudBrick 102 may take three sources of information namely building data in the form of Brick schema 104, usage behavior of individual devices in the form of MUD profiles 106, 108, and 110, and their corresponding network configurations 112. The linker module 114 may then combine these data sources 104, 106, 108, 110, and 112 and may generate the formal model 116 of the IoT system (i.e., system ontology) which is machine-readable and captures data of assets and their relationships. We note that in some embodiments data from Brick schema 104 and MUD profiles 106, 108, and 110 may contain formal semantics while the data format of network configurations 112 may vary across different organizations. In such instances, the linker module 114 may be configured to be extensible accepting various formats of configurations. The linker module 114 may be of particular importance for its utility in fusing the Brick schema 104, the MUD profiles 106, 108, 110, and network configurations 112 into a system ontology 116. For these embodiments, the linker module 114 may effectively merge these data sources. In some embodiments, overlapping data may be merged, some data discarded, while some current schema may be extended. In some embodiments one may choose to extend all three schemas or a subset of them, making them fusible.

In various embodiments, two applications may exist that consume the knowledge representation or formal model 116 to enhance the security of the entire infrastructure:

(1) a dynamic verification application: once the ontology is created, MudBrick may generate flow rules 118 (in the form of access control lists or ACLs) that may get enforced in operational networks using programmable networking techniques and switches 126. The runtime activity of network flow rules 118 may be periodically collected from the network switch 126 and fed to a set of pre-trained anomaly detection models 124, each specific to the controller of devices from a particular type 128 and 130 and their building location 140 and 150 of the university campus 160.

(2) a static verification application 122: the system ontology 116 can also be checked whether it is compatible with a given set of policies in an organization—such verification may help to identify links (communications), which may violate intended policies 122, and hence, may need to be pruned. This enables enterprise network operators to request the installation team or respective manufacturers to make necessary changes for acceptance.

In some instances the description of a physical environment, e.g., Brick schema, may be more extensive than the other two schema input types 106, 108, 110 and 112. As such, it may be desirable in some instances to extend the Brick schema 104 with two new "semantics", namely MUD profiles 106, 108, 110 and NETWORK CONFIG 112. These new semantics play the role of "hooks" or adapter to absorb MUD profiles 106, 108, 110 and NETWORK CONFIG 112.

For the MUD profiles 106, 108, 110, the existing "Sensor" class is extended in the Brick schema 104. For an example, see FIG. 4 in which "FromDevice" and "ToDevice" properties are extended and class properties are represented. For the NETWORK CONFIG 112 semantic, the existing class "Equipment" and "sensor" class is extended in the Brick schema, see FIG. 5 for an example.

Figure 2:
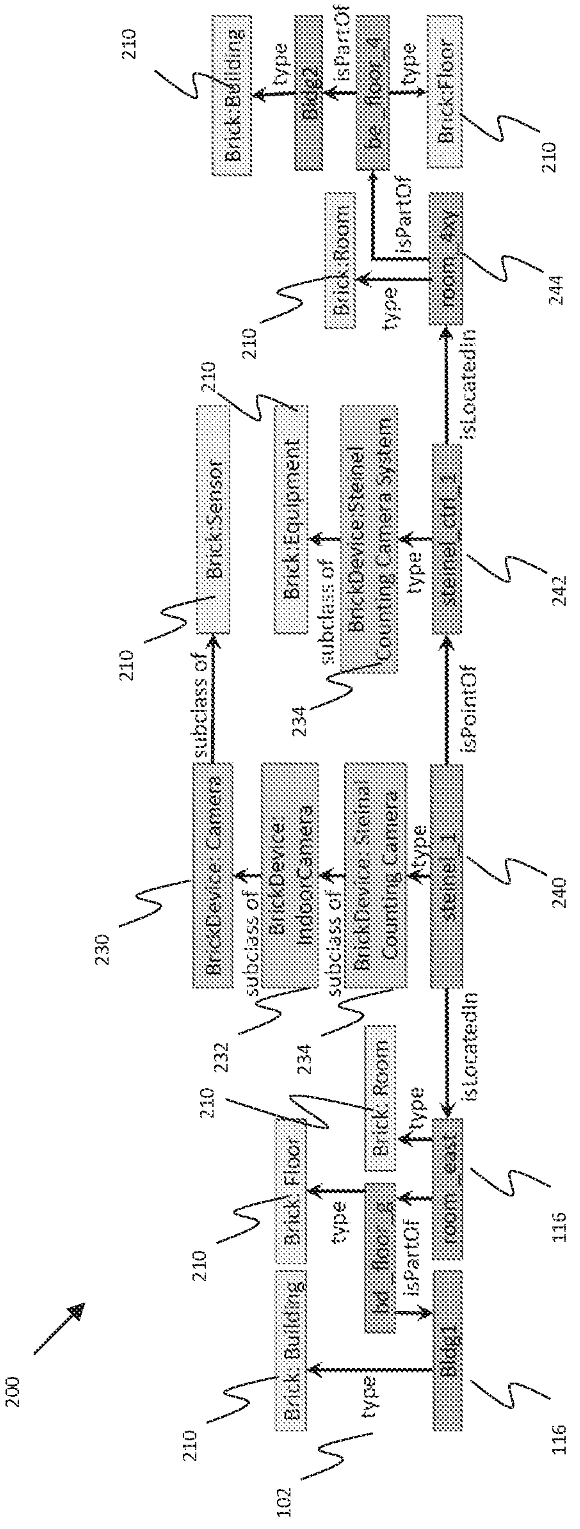
FIG. 2 depicts an example of building data represented using Brick schema.

Brick schema 104 is a data model that defines the kind of entities (subsystems) in a building 140 and 150 and the relationships among them. To better visualize this schema, FIG. 2 depicts the Brick representation 200 for a subset of our IoT infrastructure. Each node represents either a class or an entity instance, and each edge describes the relationship between nodes. Green nodes 210 are classes, which are defined by the original Brick schema and yellow nodes 230, 232, 234 are classes that we have extended by inheriting from an original schema. In some instances, there may not be a definition for a network device. In the present example, we assume the current version of Brick does not have a definition for cameras, but it provides an extendable hierarchy. The extendable hierarchy allows for a new device class called "Camera" which is a subclass of existing "Sensor" to be implemented in a hierarchical manner. Finally, the Blue nodes 116, 240, 242, and 244 of FIG. 2 represent various entities in buildings.

In the example illustrated in FIG. 2, a people counting camera (steinel_1), manufactured by Steinel [44], is an instance of class "Steinel Counting Camera". This device is installed in the eastern room (room_east) on the ground floor (bd_ _floor g) of building Bldg1—actual names of buildings and rooms are obfuscated for privacy reasons. The counting camera communicates with its controller (steinel crtl 1) which is derived from Brick's class Equipment. The controller is located in room 4xy at the fourth floor of building Bldg2.

Figure 3:
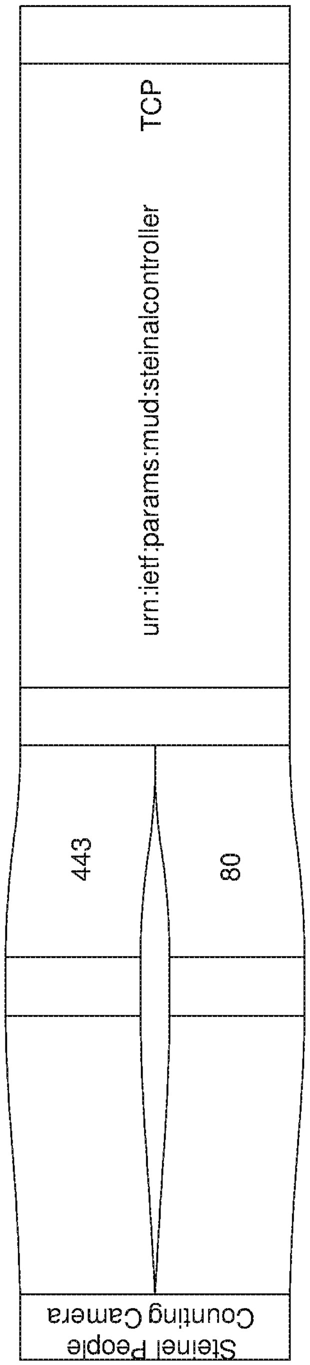
FIG. 3 depicts a Sankey diagram of a MUD profile for a Steinel people counting camera.

MUD profile: In some embodiments, the network traffic trace of the campus IoT infrastructure may be collected, and then the MUD profile may be generated for the three types of devices using a MUDgee tool. An exemplary tool is described in A. Hamza, D. Ranathunga, H. Habibi Gharakheili, M. Roughan, and V. Sivaraman, "Clear as MUD: Generating, Validating and Applying IoT Behavioral Profiles," in Proc. ACM IoT S&P, Budapest, Hungary, August 2018, and incorporated in its entirety by reference. FIG. 3 depicts a visualization of the MUD profile of the Steinel people counting camera. The figure depicts the device exposing TCP port 443 and 80 to its controller, the controller periodically communicating with the camera to collect measurements. Note that the controller (i.e., urn:ietf:params:mud:steinelbroker) can be provisioned either locally or in a remote network.

Network: In one implementation, we obtained (from our campus IT department) a spreadsheet of network configurations for all connected IoT devices and their corresponding controllers in the campus IoT system. It contained MAC address, reserved IP address of every device, physical port number they are connected to, their VLAN configurations, and host-names.

Figure 4:
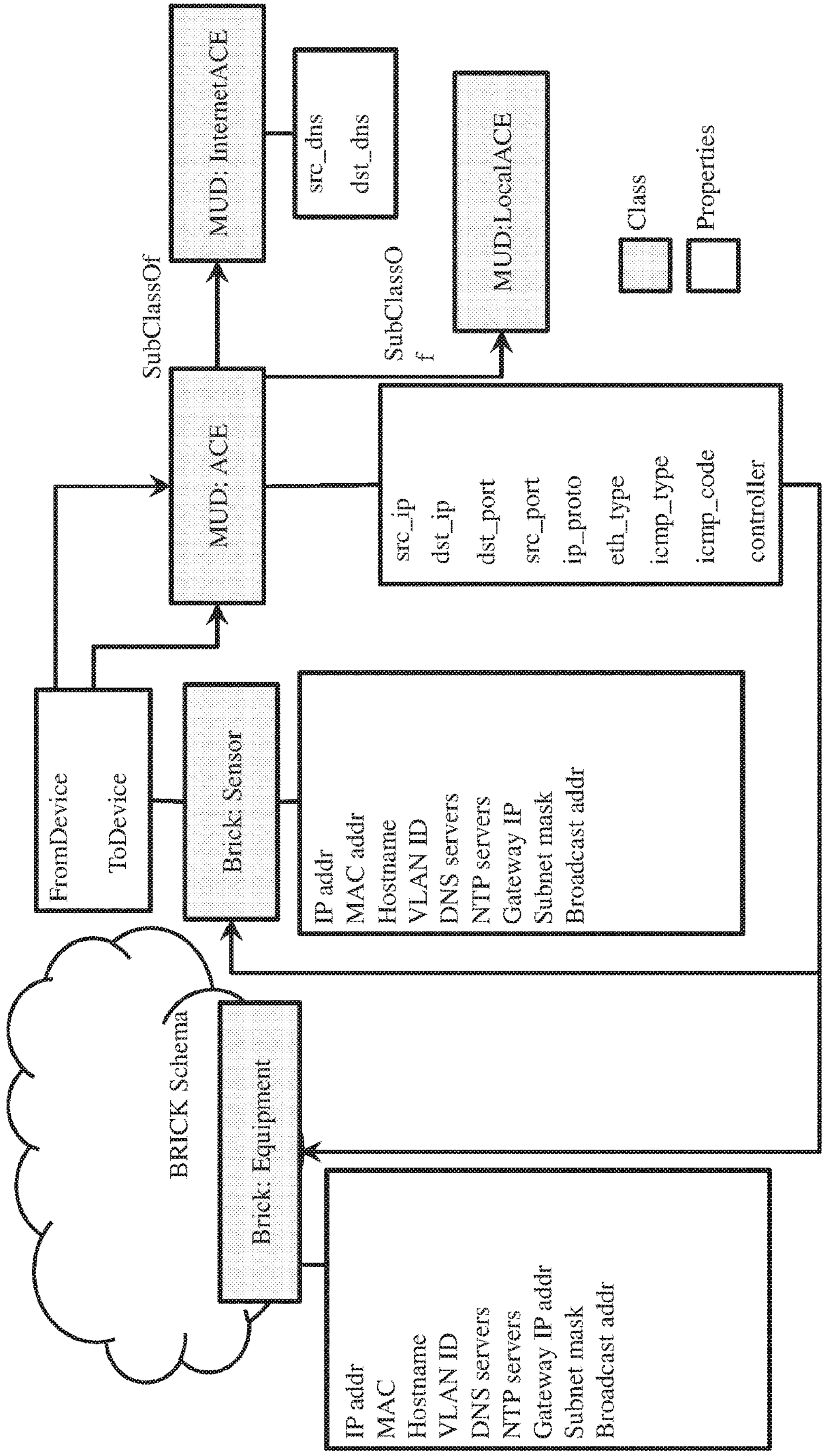
FIG. 4 depicts a partial illustration of intermediate semantics after combining a MUD profile, network configurations, and Brick schema.

IoT Ontology: In one implementation, an augmented Brick schema was developed with two semantics (one for MUD and one for network configs), each comprising of classes and properties. Such a Brick schema may allow the data from IoT MUD profiles with the network configurations and the building metadata to be combined. These semantics can then be used to build a machine-readable knowledge representation of the entire system. FIG. 4 depicts the MUD semantics. Two properties were introduced into the system to capture the direction of communication. While the two properties are depicted as FromDevice and ToDevice, they may be substituted as required by a system administrator. These properties may be applied to the class Sensor and point to an ACE class. In various embodiments, the ACE class may inherit properties from the MUD data—it contains an endpoint to a fixed IP address, domain name or a controller tag. In some cases, the controller tag may be an object derived from the class Sensor or Equipment in Brick. Similarly, for network configurations, semantics may be added to capture all configurations as properties of a Sensor or Equipment. Note that the automatic correlation of these three data sources (i.e., Brick, MUD, network configs) could be challenging since a unique identifier across data sources is required. In the present dataset, an IoT device MAC address is used as the unique key for combining building data and network configurations, and device type was used to combine MUD profiles and building data.

Figure 5:
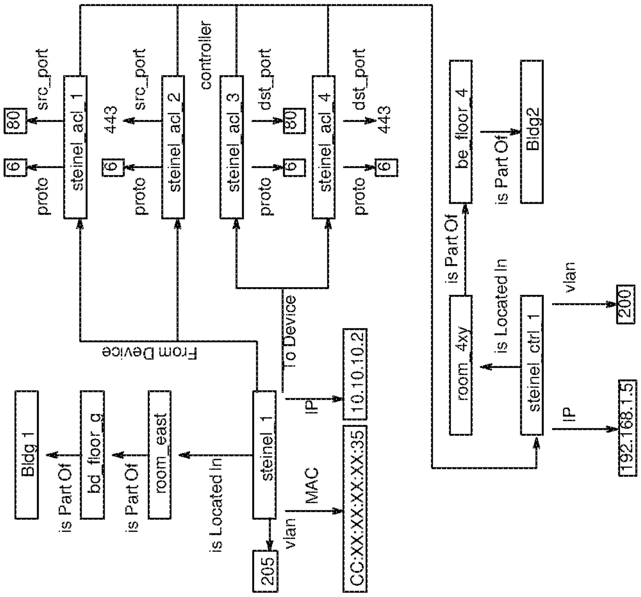
FIG. 5 depicts a partial illustration of intermediate form of our IoT infrastructure.

FIG. 5 visualizes a part of intermediate form (not the semantics). Within the figure, the steinel_1 communicates with steinel_ _ctrl 1—protocols, port numbers, VLAN, IP/MAC addresses of the Steinel counting camera and its controller are captured in this form. With the intermediate form characterized, various queries over the ontology can be made. For example, the IP address of all cameras located in building Bldg1 can be obtained by:

```
<sensor.ip> := (sensor.type = Camera ∧
sensor.isLocatedIn.isPartOf = Bldg1 ∧
sensor.isLocatedIn.isPartOf.type = Building)
```

In the above statement, <sensor.ip> indicates the returned value and "." operator (e.g., .type) indicates a property of a given node and a node, in this case, is a class in ontology. In listing 1, we show the actual SPARQL query corresponding to the statement above.

Listing 1: SPARQL query to retrieve IP address of all cameras in building Bldg1.

```
PREFIX rdf: <http://www.w3.org/1999/02/22-rdf-syntax-ns#>
PREFIX rdfs: <http://www.w3.org/2000/01/rdf-schema#>
PREFIX brick: <https://brickschema.org/schema/1.0.3/Brick#>
PREFIX bricknetwork:
<https://iotanalytics.unsw.edu.au/schema/1.0.0/BrickNetwork#>
PREFIX bf: <https://brickschema.org/schema/1.0.3/BrickFrame#>
PREFIX brickdevice:
```

-continued

Listing 1: SPARQL query to retrieve IP address of all cameras in building Bldg1.

```
<https://iotanalytics.unsw.edu.au/schema/1.0.0/BrickDevice#>
PREFIX : <https://iotanalytics.unsw.edu.au/ontology/>
SELECT ?ip WHERE {
?sensorType rdfs:subClassOf* brickdevice:Camera.
?device rdf:type ?sensorType.
?device bf:isLocatedIn ?location.
?location bf:isPartOf* ?partOf.
?partOf rdf:type brick:Building.
?device bricknetwork:reservedIP ?ip.
Filter ( ?partOf in (:Bldg1))}
```

MudBrick tools can be developed using a number of technologies. In one embodiment, the MudBrick tool is developed using Apache Jena, and ran it on a machine with Intel 8 Core CPU 2.7 GHz and 8 GB of RAM on Mac OS X. One such example of using Apache Jena is provided in Apache. (2000) Apache Jena. [Online]. Available: https://jena.apache.org/, which is included in its entirety by reference. In the present example, the IoT infrastructure, the size of input data sources was 32 KB while MudBrick generated the formal model of size 59 KB. Also, a search query (e.g., Listing 1) on average is responded in less than 200 ms. In order to evaluate the performance of MudBrick at scale, we simulated a large and complex environment by extending number of devices (up to 10000) and their MUD flows (up to 150 per device). Table I shows the impact of devices count and the complexity of their behavior on the size of our formal model and search response time. In such an example, the search response time is consistently kept below 200 ms, even at the largest scale (10000 IoT devices and 150 ACLs per device) where the model size reaches to 3200 KB.

Once the system ontology (formal model) is generated, MudBrick may translate the ontology into a set of flow rules (per device) that can be enforced to the network. The formal model may allow Internet endpoints to be specified by their domain-name. ACEs pertinent to Internet communications (with domain-name) however cannot be directly translated to flow rules, and hence, need further inspection to infer DNS bindings (mapping DNS names to IP addresses for the various servers/controllers) at run-time. Obviously, ACEs with endpoints specified by IP address may be proactively inserted into the switch—others may be reactively inserted after bindings are determined. Moreover, ACEs obtained from the formal model can be directly translated to flow rules, but they may require a notion of rules priority to tightly enforce the activity of IoT devices on the network.

TABLE I

Impact of devices count and the complexity of their behavior on the size of formal model and search response time (from simulated dataset).

| # IoTs | # MUD ACL per IoT | Model size (KB) | Search response time (ms) |
|---|---|---|---|
| 20 | 14 | 52 | ~200 |
| 20 | 150 | 210 | ~200 |
| 100 | 14 | 175 | ~200 |
| 100 | 150 | 588 | ~200 |
| 10000 | 150 | 3200 | ~200 |

IV. Anomaly Detection

Network activity of the IoT system (flow rules and associated location of devices obtained from the ontology) can now be monitored at run-time. In this section, we begin by looking at various patterns of IoT traffic.

Monitoring IoT Traffic Patterns

Figure 6A:
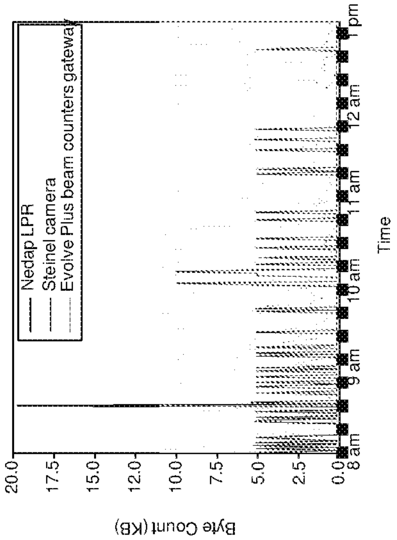
FIG. 6A is a graph which depicts a Time-trace or temporal aggregation of traffic exchanged between three device types in an exemplary infrastructure.

FIG. 6A depicts the temporal pattern of network traffic (aggregate of all flows) for the three device types in our exemplary infrastructure, between 8 am and 1 pm on a typical weekday. Note that devices communicate only with their respective controller. Nedap license plate recognition (LPR) cameras, shown by solid blue lines, generate network traffic whenever they detect a moving object (vehicle). The LPR camera is fairly active early in the morning during 8 am to 10 am transmitting data up to 20 KB per minute to its controller, and its activity slowly becomes infrequent after that—this network behavior matches normal usage of the car park on campus. Steinel cameras, instead, may periodically (shown by dashed lines in FIG. 6A) send counts of people to their controller—a fairly consistent traffic rate of 7.5 KB per minute. For the third category of network behavior, the EvolvePlus beam counters gateway which publishes data (count in/out) every minute if there are movements of people, otherwise, it communicates "Hello" messages every 10-minute (shown by red dashed-dotted lines in FIG. 6A). Note that beam counter sensors talk wirelessly to a gateway (in their proximity) which then relays (over Ethernet) aggregate data from connected sensors to a remote controller.

Figure 6B:
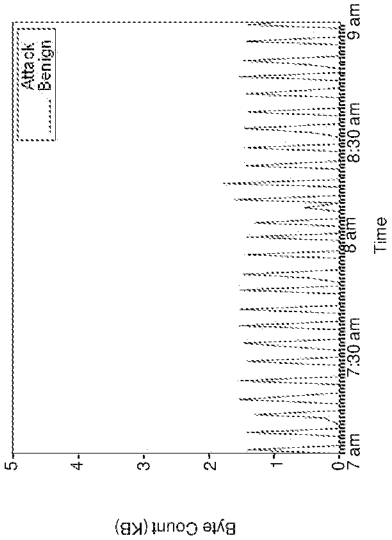
FIG. 6B is a graph depicting aggregated traffic patterns suggestive of either benign network activity and an. attack traffic pattern of beam counters gateway.

In FIG. 6B we show the change of traffic pattern during an attack on beam counters. In one of the lecture theaters, a frequency jamming attack (emulated by manually removing the battery from sensors) was launched, resulting in the beam counters ceasing the transmission of data to their local gateway. As shown in FIG. 6B, early morning (between 7 am and 9 am) on a typical weekday this gateway displays a periodic traffic pattern (normal Hello messages every 10-min) since there is no class scheduled during this period resulting in no movements. Focusing on traffic patterns during an attack (as shown in FIG. 6B), a clear anomaly is observed—large spikes of about 5 KB per minute are caused by error messages generated by the gateway due to missing sensors. Of note, the normal traffic pattern varies over time, and hence a simple thresholding approach would not be sufficient to distinguish normal and anomalous patterns. As a result, a data-driven models are used to learn the normal behavior of various devices located in different buildings.

B. Anomaly Detection Model

Figure 7:
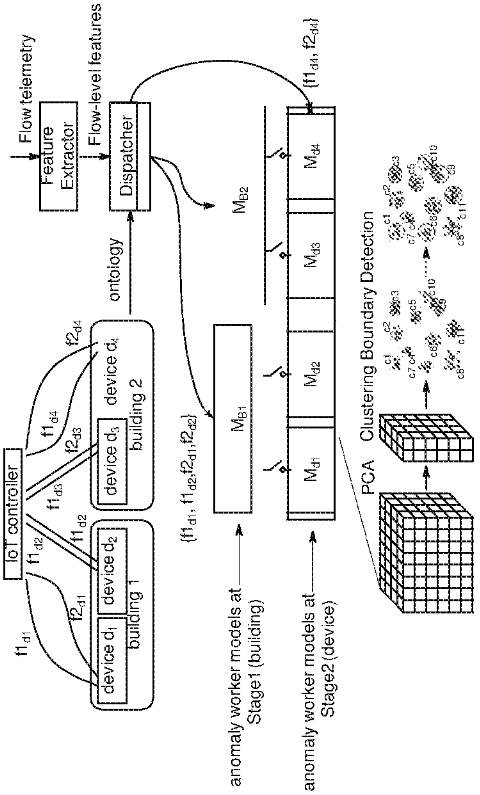
FIG. 7 depicts an exemplary embodiment of a MUD Brick system for anomaly detection in network traffic flows. a sample IoT controller that communicates with four devices located in two buildings (two devices in each building) where each device generates two flows (f1 and f2) for its network activity.

A machine learning technique may be used to determine if the IoT infrastructure is affected by a cyber-attack (the "attack detection"), and if so, to determine the contributing building or device (the "attack identification"). In some cases, one objective is to train the machine with benign traffic profile (one class classifier) of each IoT controller, and detect attacks by flagging deviation (from expected pattern) in traffic flows of a controller (obtained from the system ontology). FIG. 7 illustrates a high-level structure of our anomaly detection engine. For each IoT controller, we can train models at two levels of granularity, namely building level (Stage1: MBi) and device level (Stage2: Mdk).

FIG. 7: Structure of our anomaly detection—illustrating a sample IoT controller that communicates with four devices located in two buildings (two devices in each building) where each device generates two flows (f1 and f2) for its network activity.

At Stage1, building models (coarse-grained) monitor the behavior of aggregate of IoT devices in a building that communicate with a given controller, while at Stage2, device models (fine-grained) capture the activity of individual devices per controller. An anomaly is detected when both Stage1 and Stage2 models raise alarms. The features are computed from the time-series signal of flow activities. Note that network flows are obtained by applying policies to the system ontology and enforced to the network. For example, Table II displays flow rules for each unit of Steinel camera. The flow counters are retrieved every minute to construct the required time-series at run-time (FIG. 1).

Feature Extractor: Embodiments of the present disclosure may preserve privacy since the profile is developed from observing network traffic pertaining to the device. Instead of looking into the data to/from the IoT device, "meta-data" may be extracted and associated with the network activity of the device at flow levels. Using this meta-data, the behavioral models of devices can be built. Doing so, a temporal sliding window of 60 data-points (byte count of individual flow rule) can be maintained. Several features can be extracted by time-series analysis. In one embodiment, a Wrapper method can be used to select the most important features per each flow. One such example is provided and incorporated in its entirety by reference S. Khalid, T. Khalil, and S. Nasreen, "A survey of feature selection and feature extraction techniques in machine learning," in 2014 Science and Information Conference. IEEE, 2014, pp. 372-378. The flow-level features are: (1) mean, (2) variance, (3) sum, (4) count above mean, (5) count below mean, (6) the longest strike above mean, (7) the longest strike below mean, (8) zero count, (9) number of peaks, (10) number of time crossing, (11) absolute sum of changes, (12) mean absolute change, (13) hour-of-day, and (14) day-of-week. Note that the total number of features for each model (MBi and Mdk) varies depending on the count of flows per device and count of devices per building.

TABLE II

Network flows monitored for each unit of Steinel people counting camera.

| source | destination | proto | srcPort | dstPort |
|---|---|---|---|---|
| <deviceIP> | <controllerIP> | 6 | 80 | * |
| <deviceIP> | <controllerIP> | 6 | 443 | * |
| <controllerIP> | <deviceIP> | 6 | * | 80 |
| <controllerIP> | <deviceIP> | 6 | * | 443 |

Dispatcher: This module batches a collection of features (computed on network telemetry) and disseminates them across their corresponding models. Note that Stage1 models are trained by the network behavior of a group of devices that reside in a building. The dispatcher obtains situational information (mapping of devices to buildings) from the ontology. As illustrated in FIG. 7, the dispatcher feeds the flow-level features of two devices d1 and d2 to their building's model MB1. Detection of an anomaly at Stage1 would activate corresponding Stage2 models where the dispatcher simply presents the features of individual devices to their device models (Mdi)—no situational information is needed for Stage2 inferencing.

Anomaly Worker Models: One-class classifier workers are used for detecting anomalies in Stages 1 & 2—these workers are trained by the features of benign traffic (normal) from their respective IoT device type, and are able to detect whether a traffic observation belongs to the normal class or not. A clustering-based outlier detection algorithm is provided. In some embodiments, the clustering-based outlier detection algorithm comprises three steps namely, principal component analysis (PCA), Clustering, and Boundary Detection, as shown at the bottom of FIG. 7. For each model (building-level or device-level) we use PCA along with Kaiser method to reduce features count. For example, we have four units of Steinel cameras in a building of a university campus collectively result in a total of two hundred twenty-four (224) features for the building model (Stage1) and fifty-six features for the device model (Stage2). Features can be reduced, for example by applying PCA. In the present example, applying PCA reduced the count of features to 16 and 6 in Stage1 and Stage2 models, respectively. For anomaly detection, X-Means clustering algorithm (a variant of K-means algorithm, but K is self-tuned) was used first to identify normal clusters, followed by a boundary detection algorithm that identifies the boundary of each cluster.

TABLE III

Our dataset: training, testing, and attack instances.

| Device type | # devices | # of training instances per device | # of testing instances per device | average # of attack instances per device |
|---|---|---|---|---|
| LPR | 2 | 22000 | 33575 | 2674 |
| EvolvePlus | 4 | 22000 | 21940 | 1036 |
| Steinel | 6 | 22000 | 21158 | 2752 |

TABLE IV

Impact of various features on the performance of anomaly detection.

| | Anomaly detectors | TPR (detected at-tack instances) | FPR (mis-detected benign instances) | Accuracy: (TP + TN)/ (TP + FP + TN + FN) |
|---|---|---|---|---|
| feature-set-1 | our 14 features of individual ACL flows | 88.0 | 7.2 | 92.5 |
| feature-set-2 | our 14 features of aggregate ACL flows (incoming & outgoing) | 0.0 | 0.0 | 92.4 |
| feature-set-3 | Features [36] of individual ACL flows | 59.5 | 5.0 | 92.7 |

C. Dataset

During one implementation, a number of benign and attack traffic traces for each of the 20 devices installed in seven different buildings over a period of six weeks were received. To receive traffic traces, the entire traffic can be mirrored, i.e., both incoming and outgoing network traffic, on the access link of the server on which all IoT controllers run, to a collector server. Next the "tcpdump" tool can be used to record PCAPs on the collector. Replaying PCAPs on an SDN emulator to generate flow-level telemetry needed for model training and testing was performed. The dataset is summarized in Table III. For example, for each unit of LPR camera, a total of more than 50,000 benign instances and about 2,500 attack instances were generated.

To generate attack traffic, a number of attacks can be launched. In the present example, three types of attacks were launched. An attack on the LPR cameras was simulated by covering the lens to stop normal operation (detecting cars entering/exiting). An emulated jamming attack was launched on the beam counters, see FIG. 6B. A malware attack against the Steinel cameras was emulated by doubling the rate of pulling data from the camera with the intended objective of exhausting the device battery.

D. Feature Analysis

Features inform anomaly detector models. Table IV summarizes the impact of three different feature sets on the performance of anomaly detection: (a) "feature-set-1" corresponds to the 14 features of individual ACL flows, e.g., HTTP, HTTPS, we identified in § IV-B; (b) "feature-set-2" corresponds to the same features, but computed on aggregate of ACL flows (one incoming and on outgoing); and (c) "feature-set-3" corresponds to features used for detecting volumetric attacks—this set computes sum, mean, and variance of packet size and count at multiple time-granularities including 2-min, 3-min, 4-min, 8-min, 16-min, and 64-min. Even though the three feature sets give almost the same overall accuracy (about 92%) the feature-set-2 completely misses attack instances, highlighting the fact that coarse-grained flow telemetry would not be able to tightly model the network behaviors, and hence results in poor visibility. Also, the feature-set-3 is shown to yield a lower TPR (59.5%) compared to the feature-set-1 (88.0%). The feature-set-1 provides the best result in terms of attack detection and FPR. This may be due to features-set-1 capturing more information of the timeseries waveform and detects subtle changes in traffic rates, but features-set-2 fails to capture fine-grained behaviors, hence giving poor performance. Looking into individual attacks, the feature-set-1 was able to detect all attack streams with some delays (particularly, early attack instances, closer to the start, went undetected), causing a reduction in TPR. Note that, the average delay in detecting attacks on license-late recognition (LPR) camera, beam counters (EvolvePlus), and people counting cameras (Steinel) was 55 min, 19 min, and 1 min, respectively.

displaying behaviors closer to benign traffic at least in short-term. Lastly, it is important to note that a larger window would result in a higher cost for computing and maintaining features.

E. Evaluation Results of Attack Detection

During one implementation, the accuracies of the trained models (Stage1 and Stage2) in detecting attacks were determined. A summary of results is shown in Table V. The performance of models in three scenarios namely "Stage1 only", "Stage2 only", and "Stage1&Stage2 combined" was quantified. Note that Stage2-only inferencing is a device-specific anomaly detection scheme that can be used as a baseline for analysis. Of note, the best accuracy (92.5%) was obtained when a combination of both Stages was used. Also of note, combining Stage1 and Stage2 reduced the false-positive-rate (FPR) to a minimum of 7.2%. This FPR may still sound high for some IoT infrastructures. Importantly, the majority (more than 90%) of false-positive alarms do not persist for successive one-minute epochs (intermittent alarms), and hence the risk of mis-classification is low. In some embodiments, one can reduce the FPR by raising alarms only when an attack persists over successive epochs. For example, expecting persistence over two epochs would reduce the FPR to 5% —this filtering can also lead to a lower TPR, and hence incurring a delay in detecting attacks. In terms of detection rate, we see that Stage1 only gives a better result (97.5% TPR). However, it does not provide any information on which device is involved in the attack.

Figure 9:
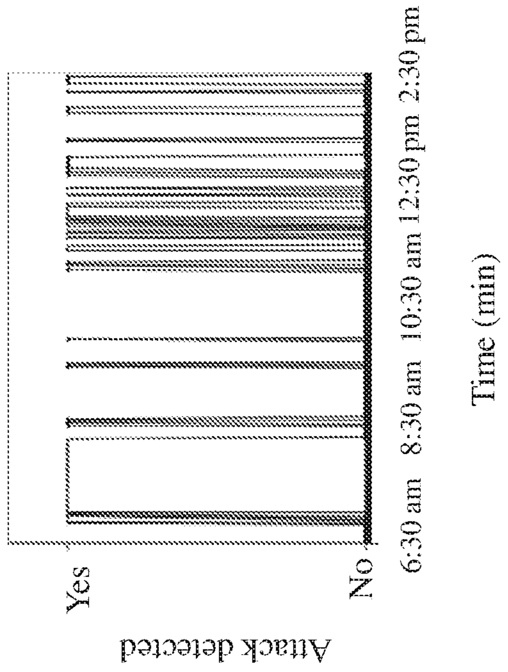
FIG. 9 is a detected instances of an attack on EvolvePlus sensors gateway with 27% True Positive Rate (TPR).

Note that for the Steinel controller (the last column in Table V), given its periodic traffic pattern, having two stages of inferencing does not enhance the performance of models—each of Stage1 or Stage2 gives the same accuracy as the combined models (100% TPR and 5-6% FPR). Moving to LPR and EvolvePlus controllers, we observe that "Stage1-only" gives an acceptable detection rate (92.0% in LPR and 98.4% in EvolvePlus), but the TPR for combined models is relatively lower. For example, models for two of the beam counters detected 75% of attacks while the other two models detected only 27% of attack instances. This may be due to the Stage2 model has a broad view of normal behavior, and hence misses some attack instances. Another reason may be due to the delay in detecting attacks as the change in traffic patterns (by our attacks) is not very significant to get detected immediately, or expected traffic rate during certain hours (e.g., between 9 am-11:30 am in FIG. 9) is fairly low. Note that one can further enhance the performance of attack detection by using an ensemble method fed by the output of the Stage1 and Stage2 models described herein.

TABLE V

Performance results of anomaly detection models.

| | All devices | | | LPR | | EvolvePlus | | Steinel | |
|---|---|---|---|---|---|---|---|---|---|
| Anomaly detectors | Accuracy | TPR | FPR | TPR | FPR | TPR | FPR | TPR | FPR |
| Stage1 only | 84.6 | 97.5 | 16.5 | 92.0 | 13.2 | 98.4 | 16.8 | 1.0 | 6.7 |
| Stage2 only | 88.3 | 88.1 | 11.7 | 78.9 | 11.1 | 52.6 | 17.3 | 1.0 | 6.0 |
| Stage1 & Stage2 combined | 92.5 | 88.0 | 7.2 | 78.8 | 8.4 | 52.4 | 5.11 | 1.0 | 5.1 |

Figure 8:
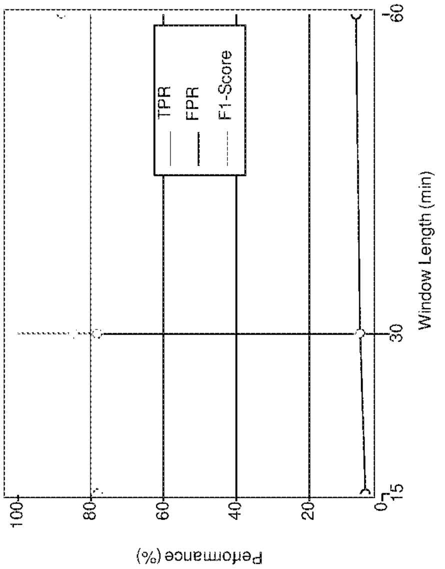
FIG. 8 is a graph demonstrating the impact of window size on the performance of anomaly detection arising from a MUD Brick ontology.

The impact of the length of sliding windows on the performance of models was also investigated. Referring to FIG. 8, unsurprisingly, the overall accuracy (F1-Score) and TPR improve with larger windows, but at the cost of slightly higher false positives (mis-detecting benign instances), especially when attacks are low-profile and long in duration, It has been shown that the results of the present invention demonstrate: how a device's location (derived from the formal knowledge representation) can be incorporated in order to model the normal behavior of IoT systems; and how location-aware models augment device-specific models in detecting distributed anomalies.

V. Verifying Compatibility of Formal Model with Location-Defined Network Policies In traditional IT infrastructure, policies are typically enforced at run-time and often implemented in the form of "Match" and "Action" pairs—if packet headers match the criteria specified by the policy, then the policy action is applied to the packet. Such implementations are reactive and often do not consider the situational context of policies. In this section, a method to (proactively) verify the compatibility of a formal model with location-defined network policies (pre-deployment), using semantics is defined.

In some embodiments, policies are leveraged post generation of the system ontology. Note that the system ontology is a model of all potential network communications across the IoT system. The network communications can then be "pruned" based on organizational policies (e.g., restricting access to certain resources to specific operational zones), resulting in a model of expected system behavior. It is important to note that at least in some cases the complex task is converting the policy into a set of conditions based on the grammar defined by the schema. In some embodiments, pruning is the action taken upon matching the policy condition. In some embodiments, the model is in the form of a graph showing relationships between devices, their location, and servers/controllers, with directional edges that have attributes (e.g., specifying protocols, ports, and volumes).

The impact and spread of attacks originating outside or inside the organization can be assessed using the model, as can that of adding new devices or updating firmware in existing devices in the network, by simply resynthesizing the model with the updated information. The model, therefore, allows evaluation of the system even before it is built, and several "what if" scenarios can be explored prior to a field trial or real deployment.

For a policy verification system, it is essential to have three main components: (1) semantics of policy intent, (2) methods to detect/resolve conflicting policies, and (3) verification of policies against the system ontology. Note that conflict detection/resolution is beyond the scope of this description. In what follows next, we consider semantics and verification of three representative policies.

1. Deployment Policies: These policies may be considered during the installation phase. For example, enterprise IoT devices typically support multiple communication protocols (e.g., BACnet, Modbus, and HTTP/HTTPS). They may only use a specific protocol when integrated with the building automation system (with variable protocol capabilities). However, selectively disabling unsupported communication protocols is not accommodated by the MUD standard. Instead, the system ontology may be pruned to meet desired deployment policies before it is enforced to the network.

We consider the following scenario to emulate a representative deployment policy in our infrastructure: "Steinel people counting camera supports both HTTP and HTTPS protocols.

However, the controller in building Bldg2 only supports HTTPS". This policy is stated by:

```
acl = (sensor.isFromDevice ∪ sensor.isToDevice)
P1: <sensors, acls> := sensor.type = "Steinel Counting Camera" ∧
   acl.controller.isLocatedIn.isPartOf = Bldg2 ∧
   acl.controller.isLocatedIn.isPartOf.type = Building ∧ acl.protocol = 6 ∧
     (acl.src port = 80 ∨ acl.dst port = 80)
```

The above policy SPARQL is implemented, checked against the ontology of our IoT infrastructure, and extracted devices and ACEs that violate this policy (top row in Table VI). Every Steinel camera (six cameras) in building Bldg2 has two violating ACEs in their MUD profile. Note that six device nodes are pointed to the same couple of ACE nodes in the ontology. For such a policy the default action would be to prune violating rules. Note that pruning the ontology is a nontrivial task since it may affect other devices that are connected to the same ACE node. In the case of overlapping device nodes, the violating device nodes are separated out along with a new pruned ACE node in the ontology.

TABLE VI

Representative policies and violations.

| Policy ID | # violating devices | # violating MUD ACEs |
|---|---|---|
| P1 | 6 | 2 |
| P2 | 4 | 2 |
| P3 | 8 | 4 |

2. Administrative Policies: These policies are set for administrative purposes. An example of such a policy is that devices in a "highly-restricted zone" of a building are not allowed to communicate outside the building. A synthesized policy intent of such scenario is stated by:

P2: IoT devices in the MAT Theater (located in MAT building) are not allowed to have any network communication outside the building.

```
acl = sensor.isFromDevice ∪ sensor.isToDevice
P2: <sensors, acls> := sensor.isLocatedIn = "MAT Theatre" ∧
   sensor.isLocatedIn.type = Room ∧ .isLocatedIn.isPartOf
   = "MAT" ∧ sensor.isLocatedIn.isPartOf.type = Building
   ∧ acl.controller.isLocatedIn.isPartOf != "MAT"
```

As shown in the second row in Table VI, four sensors (EvolvePlus beam counters) have violated this policy since they communicate with a controller located in another building (publishing their measurements to TCP 55555 on the controller). To address this issue, a possible solution would be to install a separate controller for those beam counters in the MAT building itself. This shows that the ontology not only is used to identify the violation but also provides the context of violating devices. It can potentially help during the design phase (pre-deployment) to cater to such administrative policies.

3. Organizational Policies: This category of policies is typically applied to the entire network. An example of this policy is given:

P3: IoT devices are not allowed to communicate over "unsecured" protocols (HTTP, FTP) across buildings, but may use these protocols within a building.

```
acl = sensor.isFromDeviceU sensor.isToDevice
  P3: <sensors, acls> := sensor.isLocatedIn.isPartOf != acl.controller.isLocatedIn.isPartOf ∧
    sensor.isLocatedIn.isPartOf.type = Building ∧
    acl.protocol = 6 ∧
    (acl.src port = 80 ∨ acl.dst port = 80 ∨ acl.src port = 21 ∨
    (acl.dst port = 21)
```

Applying this policy, eight devices violated P3 (last row in Table VI). Violating devices include six units of Steinel counting camera and the two Nedap license plate recognition (LPR) cameras since Steinel cameras use HTTP protocol while Nedap cameras use FTP protocol. Such pre-deployment compatibility checks help device manufacturers automatically identify violating behaviors of their device that may lead to a change and firmware upgrade to pass the acceptance testing.

Figure 10:
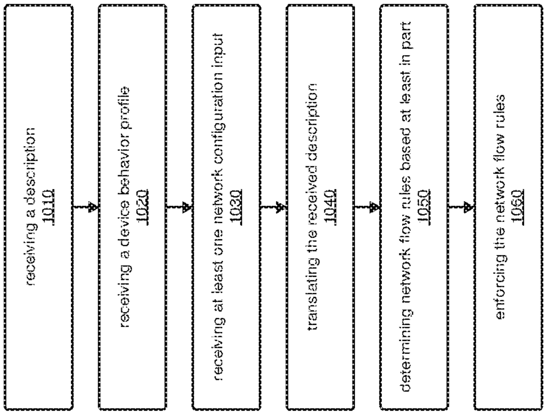
FIG. 10 depicts an exemplary method for enforcing network flow rules of a heterogeneous network of devices.
Figure 11A:
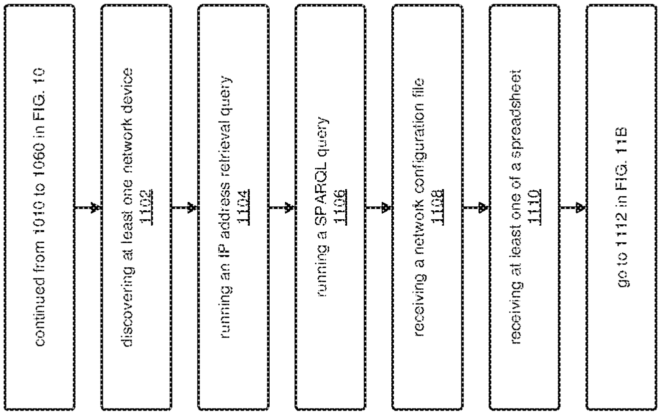
FIGS. 11A, 11B, 11C, and 11D depict operations that may supplement those shown in FIG. 10 of an example method for enforcing network flow rules of a heterogeneous network of devices.
Figure 11B:
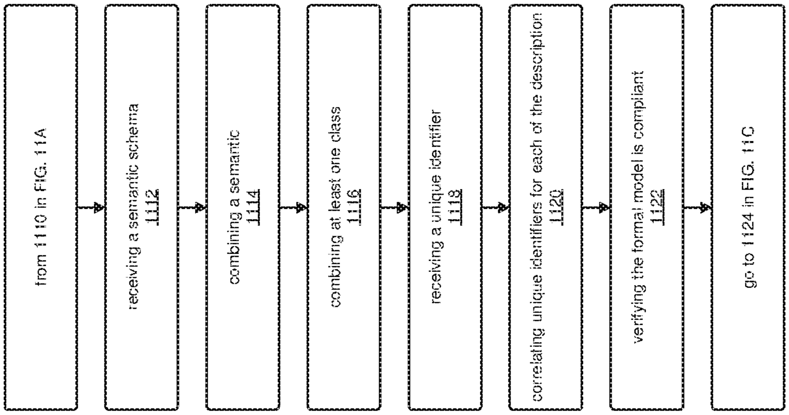
Figure 11C:
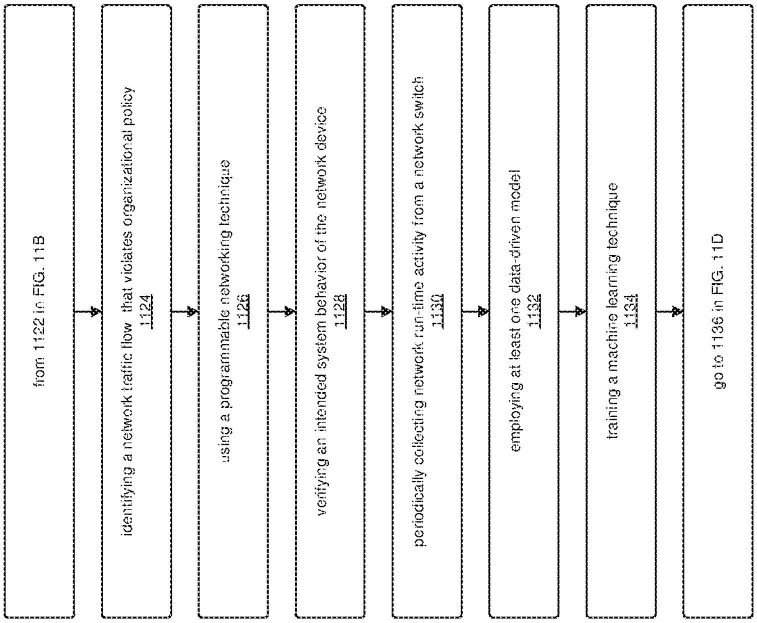
Figure 11D:
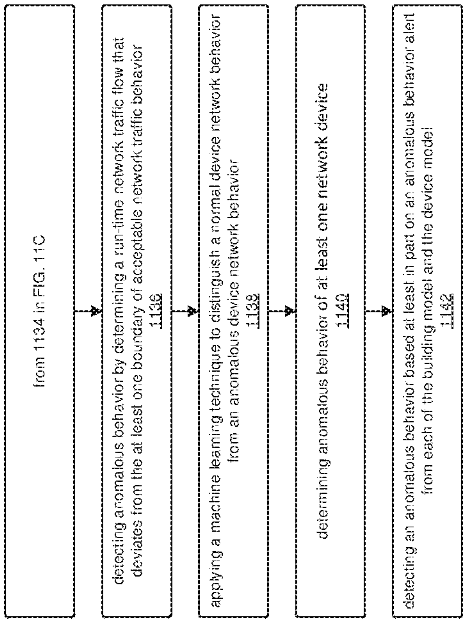

Turning now to FIG. 10, which illustrates a method for enforcing network flow rules of a heterogeneous network of devices according to some embodiments. The method at 1010 may include receiving a description of a physical environment. At 1020, the method may include receiving a device behavior profile of a plurality of network devices.

At 1030, the method may include receiving at least one network configuration input. At 1040, the method may include translating the received description of the physical environment, the received device behavior profile, and the at least one network configuration input into a formal model. At 1050, the method may include determining network flow rules based at least in part on the formal model. At 1060, the method may include enforcing the network flow rules. In some embodiments, the network flow rules enhance the security of a heterogeneous network of devices.

FIGS. 11A, 11B, 11C, and 11D show operations that may supplement the operations illustrated in the method of FIG. 10 according to some embodiments of the present disclosure. In particular, FIGS. 11A, 11B, 11C, and 11D illustrates operations 1102 to 1142 that may supplement operations 1010 to 1060 illustrated in FIG. 10. At 1102, the method may include discovering at least one network device. At 1104, the method may include running an IP address retrieval query. At 1106, the method may include running a SPARQL query. At 1108, the method may include receiving a network configuration file of the plurality of network devices.

At 1110, the method may include receiving at least one of a spreadsheet or a text file. In some embodiments, the spreadsheet or the text file of network configurations of the plurality of network devices may be received. At 1112, the method may include receiving a semantic schema. In some embodiments, the semantic schema includes at least one class and at least one property. At 1114, the method may include combining a semantic of the received description of the physical environment, and a semantic of the received device behavior profile into a machine-readable knowledge representation of the heterogeneous network of devices. At 1116, the method may include combining at least one class and at least one property of the received description of the physical environment with at least one class and at least one property of the received device behavior profile into a machine-readable knowledge representation of the heterogeneous network of devices. At 1118, the method may include receiving a unique identifier for each of the description of the physical environment, the device behavior profile of each of the plurality of network devices, and the at least one network configuration input. At 1120, the method may include correlating unique identifiers for each of the description of the physical environment, the device behavior profile of each of the plurality of network devices, and the at least one network configuration input to create a combined MUD Brick profile.

At 1122, the method may include verifying that the formal model is compliant with an organizational policy. At 1124, the method may include identifying a network traffic flow that violates the organizational policy. At 1126, the method may include using a programmable networking technique. At 1128, the method may include verifying an intended system behavior of the network device. At 1130, the method may include periodically collecting network run-time activity from a network switch. At 1132, the method may include employing at least one data-driven model based at least in part on at least one device behavior profile of a plurality of network devices.

At 1134, the method may include training a machine learning technique with a benign network traffic profile of an IoT controller. In some embodiments, the machine learning technique creates at least one boundary of acceptable network traffic behavior. At 1136, the method may include detecting anomalous behavior by determining a run-time network traffic flow that deviates from the at least one boundary of acceptable network traffic behavior. At 1138, the method may include applying a machine learning technique to distinguish a normal device network behavior from an anomalous device network behavior. At 1140, the method may include determining anomalous behavior of at least one network device based on the network flows rule. At 1142, the method may include detecting an anomalous behavior based at least in part on an anomalous behavior alert from each of the building model and the device model.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Those having ordinary skill in the art will recognize that the state of the art has progressed to the point where there is little distinction left between hardware, software, and/or firmware implementations of aspects of systems; the use of hardware, software, and/or firmware is generally a design choice representing cost vs. efficiency tradeoffs (but not always, in that in certain contexts the choice between hardware and software can become significant). Those having ordinary skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

In some implementations described herein, logic and similar implementations may include software or other control structures suitable to operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise controlling special-purpose components. Specifications or other implementations may be transmitted by one or more instances of tangible or transitory transmission media as described herein, optionally by packet transmission or otherwise by passing through distributed media at various times.

Alternatively or additionally, implementations may include executing a special-purpose instruction sequence or otherwise operating circuitry for enabling, triggering, coordinating, requesting, or otherwise causing one or more occurrences of any functional operations described above. In some variants, operational or other logical descriptions herein may be expressed directly as source code and compiled or otherwise expressed as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar modes of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those having ordinary skill in the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a USB drive, a solid state memory device, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read-only, etc.)), and/or electrical circuitry forming a communications device (e.g., a modem, communications switch, optical-electrical equipment, etc.). Those having ordinary skill in the art will recognize that the subject matter described herein may be implemented in an analog or digital fashion or some combination thereof.

Those skilled in the art will recognize that at least a portion of the devices and/or processes described herein can be integrated into a data processing system. Those having ordinary skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

In certain cases, use of a system or method as disclosed and claimed herein may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory.

Further, implementation of at least part of a system for performing a method in one territory does not preclude use of the system in another territory.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., operations), devices, objects, and the discussion accompanying them are used as examples for the sake of conceptual clarity and that various configuration modifications are contemplated. Consequently, as used herein, the specific examples set forth and the accompanying discussion are intended to be representative of their more general classes. In general, use of any specific example is intended to be representative of its class, and the non-inclusion of specific components (e.g., operations), devices, and objects should not be taken to be limiting.

With respect to the use of substantially any plural and/or singular terms herein, those having ordinary skill in the art can translate from the plural to the singular or from the singular to the plural as is appropriate to the context or application. The various singular/plural permutations are not expressly set forth herein for sake of clarity.

The herein described subject matter sometimes illustrates different components contained within, or connected with, different other components. It is to be understood that such depicted architectures are presented merely as examples, and that in fact many other architectures may be implemented which achieve the same functionality. In a conceptual sense, any arrangement of components to achieve the same functionality is effectively "associated" such that the desired functionality is achieved. Therefore, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of "operably couplable" include but are not limited to physically mateable or physically interacting components, wirelessly interactable components, wirelessly interacting components, logically interacting components, or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components, inactive-state components, or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such a recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having ordinary skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having ordinary skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented as sequences of operations, it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method for enforcing network flow rules in a heterogeneous network of devices, the method comprising:
- receiving a description of a physical environment where a plurality of network devices are installed, wherein the description of the physical environment comprises identification data and physical location data for each network device of the plurality of network devices;
- receiving at least one device behavior profile for the plurality of network devices, wherein the device behavior profile comprises flow information data indicating a pattern of communication of a network device from the plurality of network devices;
- receiving at least one network configuration of the heterogeneous network, the at least one network configuration comprising the identification data and network configuration data for the plurality of network devices;
- generating, using a processor, a fused representation of the heterogeneous network by combining, based on the identification data, the received description of the physical environment, the received at least one device behavior profile of the plurality of network devices, and the at least one network configuration;
- determining network flow rules based, at least in part, on the fused representation of the heterogeneous network; and
- enforcing, using the processor, the network flow rules for securing the heterogeneous network.

2. The method of claim 1, wherein a description of a physical environment comprises a combination of at least one of: a room name, a sensor, a utility, a building material, a building floor, a building performance, an asset list, a stairwell, an elevator, a structural element, a fire escape, a furniture piece, an available resource, a time restricted use, a temperature setting, a humidity setting, an air quality parameter, an area occupancy, an area dimension, an area usage restriction, a maintenance status, a password, a username, an area access restriction, a status, an occupancy restriction, a door, a window, an architectural floor plan, or an area intended use.

3. The method of claim 2, wherein the physical environment is at least one of a building, a campus, a maritime craft, a rail-based transportation system, an oil refinery, a mining operation, a chemical plant, a nuclear plant, an alternative energy plant, a nursery, an agricultural field, a municipality, a semiconductor foundry, a port, a warehouse, a stadium, or a university campus.

4. The method of claim 1, wherein a network device is one of a security camera, a thermostat, an occupancy sensor, a heating, ventilation, and air conditioning (HVAC) system, a lighting system, an access controller, a fire alarm, a physical security system, a camera, a networked appliance, an industrial device, or a robotic device.

5. The method of claim 1, wherein the fused representation of the heterogeneous network comprises a machine-readable knowledge representation of a network ontology, wherein the machine-readable knowledge representation of the network ontology comprises a graph, the graph comprising at least one directional edge indicating a relationship between a network device from the plurality of network devices, a physical location of the network device in the physical environment, and a controller, wherein the directional edge is assigned an attribute specifying at least one of a communication protocol, a network port, and a volume.

6. The method of claim 1, wherein the received description of the physical environment, the received device behavior profile, and the at least one network configuration are combined into is the fused representation of the heterogeneous network via a linker module, wherein the linker module builds a machine-readable knowledge representation of the heterogeneous network.

7. The method of claim 1, wherein, for each network device from the plurality of network devices, the fused representation of the heterogeneous network comprises the flow information data for the network device, the network configuration data associated with the network device, and the physical location data where the network device is installed.

8. The method of claim 1, wherein combining the received description of the physical environment, the received device behavior profile, and the at least one network configuration into the fused representation of the heterogeneous network comprises:
- combining at least one class and at least one property of the received description of the physical environment with at least one class and at least one property of the received device behavior profile into the machine-readable knowledge representation of the heterogeneous network.

9. The method of claim 8, wherein combining at least one class and at least one property of the received description of the physical environment with at least one class and at least one property of the received device behavior profile into a machine-readable knowledge representation of the heterogeneous network of devices further comprises:
- for each network device of the plurality of network devices:
- receiving a unique identifier for each of receiving, using the processor, identification data for a network device;
- determining, using the processor, physical environment data for the network device using the received identification data and the description of the physical environment;

determining, using the processor, a device behavior profile for the network device using the identification data and the received at least one device behavior profile;

determining, using the processor, network configuration data for the network device using the identification data and the at least one network configuration; and combining, using the processor, the physical environment data, the device behavior profile, and the network configuration data for the network device to create a combined MUD Brick profile.

10. The method of claim 9, wherein the identification data is at least one common device identifier found in both the description of the physical environment and the network configuration.

11. The method of claim 1, further comprising periodically collecting network run-time activity of the network flow rules from a network switch.

12. The method of claim 11, wherein the run-time activity is analyzed by a set of pre-trained anomaly detection models.

13. The method of claim 12, wherein the set of pre-trained anomaly detection models is trained to a particular network device and the description of the physical environment.

14. The method of claim 1, further comprising determining anomalous behavior of at least one network device based on the network flow rules.

15. The method of claim 14, wherein determining anomalous behavior comprises employing at least one data-driven model based, at least in part, on at least one device behavior profile of a plurality of network devices.

16. The method of claim 14, wherein determining anomalous behavior comprises applying a machine learning technique to distinguish a normal device network behavior from an anomalous device network behavior.

17. The method of claim 16, wherein the machine learning technique utilizes the fused representation paired with a clustering-based outlier detection algorithm to distinguish a normal device network behavior from an anomalous device network behavior.

18. The method of claim 16, wherein applying the machine learning technique to distinguish a normal device network behavior from an anomalous device network behavior comprises:

training a machine learning technique with a benign network traffic profile of an IoT controller, wherein the machine learning technique creates at least one boundary of acceptable network traffic behavior; and detecting anomalous behavior by determining how a run-time network traffic flow deviates from the at least one boundary of acceptable network traffic behavior.

19. The method of claim 1, further comprising an anomaly detection engine, the anomaly detection engine comprising:

a building anomaly worker model, wherein the building anomaly worker model monitors network traffic flows between the plurality of network devices and a controller;

a device anomaly worker model, wherein the device anomaly worker model monitors network traffic flows between a network device from the plurality of network devices and the controller; and detecting an anomalous behavior based at least in part on an anomalous behavior alert from each of the building anomaly worker model and the device anomaly worker model.

* * * * *